United States Patent
Hatano

(10) Patent No.: US 7,400,353 B2
(45) Date of Patent: Jul. 15, 2008

(54) SOLID STATE IMAGE PICKUP DEVICE

(75) Inventor: Toshinobu Hatano, Kyoto (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 694 days.

(21) Appl. No.: 10/951,815

(22) Filed: Sep. 29, 2004

(65) Prior Publication Data

US 2005/0068455 A1 Mar. 31, 2005

(30) Foreign Application Priority Data

Sep. 30, 2003 (JP) ............................ 2003-341671

(51) Int. Cl.
*H04N 3/14* (2006.01)
*H04N 5/335* (2006.01)

(52) U.S. Cl. ................ 348/308; 348/302; 348/294; 348/311

(58) Field of Classification Search ................. 348/294, 348/345, 308, 302, 311
See application file for complete search history.

(56) References Cited

U.S. PATENT DOCUMENTS

| 5,115,293 | A | 5/1992 | Murayama et al. |
| 5,894,143 | A | 4/1999 | Tanigawa et al. |
| 6,342,921 | B1 * | 1/2002 | Yamaguchi et al. ......... 348/322 |
| 6,377,301 | B1 * | 4/2002 | Hieda .................... 348/231.99 |
| 6,900,832 | B1 * | 5/2005 | Yano ....................... 348/222.1 |
| 2003/0086005 | A1 * | 5/2003 | Nakamura ............... 348/223.1 |
| 2004/0017493 | A1 * | 1/2004 | Daiku et al. ................ 348/272 |

FOREIGN PATENT DOCUMENTS

| JP | 2002-135793 A | 5/2002 |
| JP | 2003-116061 A | 4/2003 |

* cited by examiner

*Primary Examiner*—Vu Le
*Assistant Examiner*—Maryl Camargo
(74) *Attorney, Agent, or Firm*—McDermott Will & Emery LLP

(57) ABSTRACT

Provided is a solid state image pickup device, comprising a photoelectrical conversion element array and a pixel-data-reading-out control unit. The pixel-data-reading-out control unit controls execution of: a whole-pixel-reading-out mode for picking up still pictures, which outputs the read-out pixel data of the whole pixels in order by a data unit of a single pixel in order; a vertically/horizontally-mixed-pixel-reading-out mode for recording moving pictures, which outputs the pixel data after mixing a plurality of pixels in the vertical and horizontal directions of the photoelectrical conversion element array; and a one-directionally-mixed-pixel-reading-out mode for auto-focus, which, at the time of controlling the auto-focus, outputs pixel data mixed in only one direction by canceling mixing of pixel data for a plurality of pixels read out from the photoelectrical conversion element array in either the vertical direction or the horizontal direction of the array.

15 Claims, 12 Drawing Sheets

(For Auto-Focus Control Vertically-Mixed-Pixel-Reading-Out Mode)

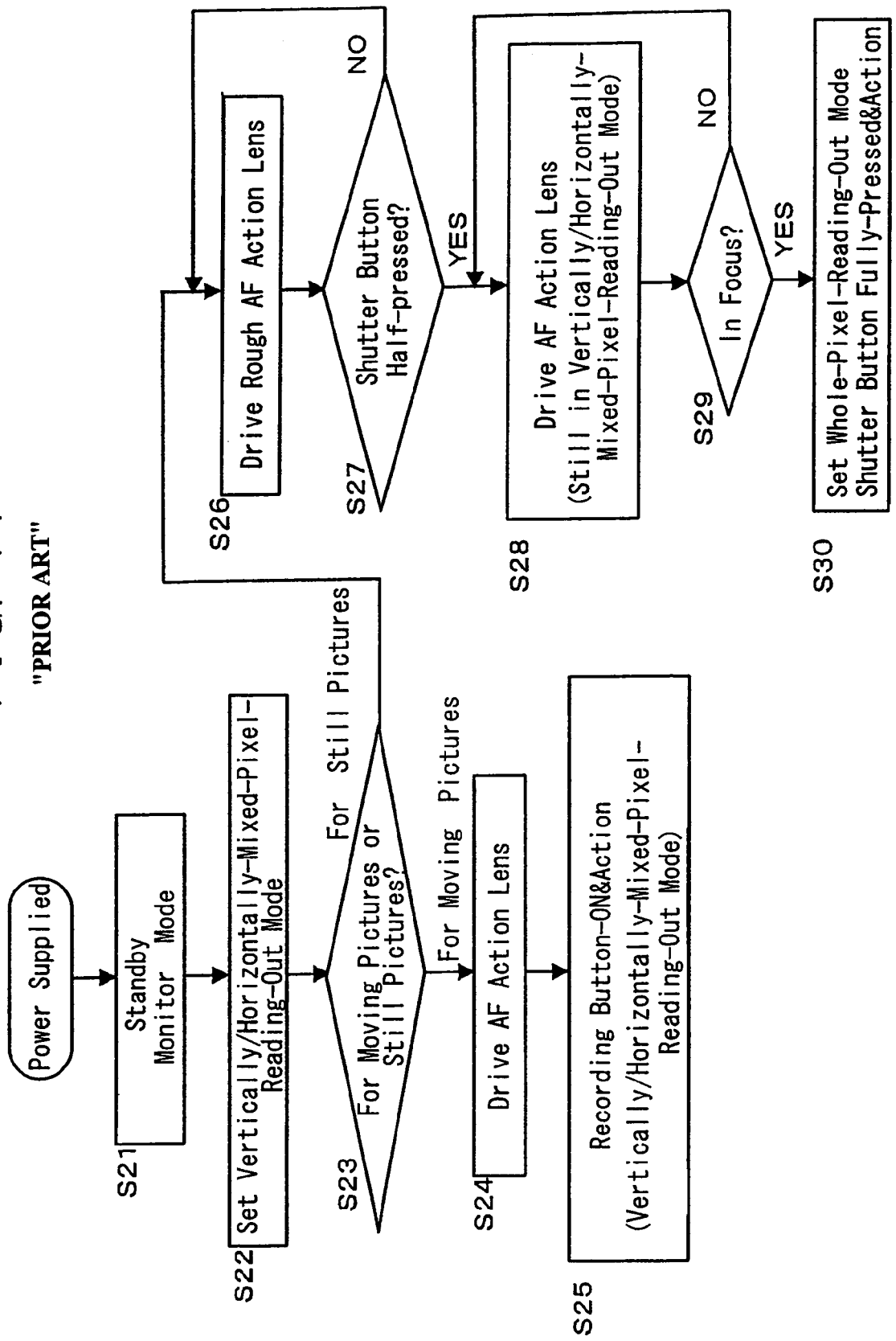
FIG. 11 "PRIOR ART"

SOLID STATE IMAGE PICKUP DEVICE

BACKGROUND OF THE INVENTION

1. Field of the Invention

The present invention relates to a solid state image pickup device and, more specifically, to a solid state image pickup device capable of switching a mode for picking up still pictures and a mode for recording moving pictures.

2. Description of Related Art

A solid state image pickup device comprises a photoelectrical conversion element array and a pixel-data-reading-out control unit for controlling reading-out of pixel data from the photoelectrical conversion element array. The photoelectrical conversion element array is formed with a plurality of photoelectrical conversion elements (pixels) arranged in matrix. The photoelectrical conversion element array generates pixel data by performing photoelectrical conversion on optical images formed on a plurality of photoelectrical elements by incident light entered through an optical system. As for the photoelectrical conversion element array, the number of pixels has been dramatically increased due to epoch-making developments in the semiconductor technology in recent years. In the solid state image pickup device using such a photoelectrical conversion element array, the pixels are utilized for enabling to pickup still pictures and to record moving pictures. For picking up still pictures, it is carried out by utilizing the pixel data for the whole pixels on the photoelectrical conversion element array. This is referred to as a whole-pixel-reading-out mode, in which the pixel data read out from the photoelectrical conversion element array are outputted in order by a data unit of each pixel. Thereby, it enables to pickup highly fine still pictures.

Meanwhile, as for recording moving pictures, it is difficult to carry out recording through the whole-pixel-reading-out mode similar to the one used at the time of picking up the still pictures, since there is a limit in the operation speed of a digital signal processing unit and due to power consumption. Thus, for recording moving pictures, in general, pixel data processing is performed, in which pixels are thinned out for increasing the number of frames per unit time. Recording of moving pictures by thinning out the pixels as described above is generally referred to as a vertically/horizontally-mixed-pixel-reading-out mode.

The vertically/horizontally-mixed-pixel-reading-out mode will be described in detail. For the pixel data read out from the photoelectrical conversion element array, a plurality of pixel data are mixed in the vertical and horizontal directions with respect to the arrangement of the photoelectrical conversion elements (pixels). And the mixed pixel data is outputted as one unit of pixel data. Thereby, the number of frames per unit time is increased, so that it enables to achieve smooth and fast recording of moving pictures by the solid state image pickup device to which the photoelectrical conversion element array with high pixels (that is, a large number of pixels) is mounted.

Thinning out of the pixels and switching of the mixed-pixel-reading-out mode and the whole-pixel-reading-out mode as described above can be excellently achieved, especially, by a MOS image sensor, since it is possible to read out pixel data in any lines at will using signal lines, without having the MOS image sensor unlike CCD image sensors, to transfer electric potentials by transferring potential well.

The MOS image sensor is advantageous in respect that it can be operated with low voltage, bears less amount of current leak, has still larger numerical aperture compared to the CCD in the same size, has high sensitivity, can read out data easily compared to the CCD, etc. Especially, it is extremely advantageous in respect that it can select and read out pixels at will, and in terms of mixing the pixels.

In a solid state image pickup device comprising an imaging monitor such as a liquid crystal display unit, auto-focusing of an optical system is performed. In general, in the initial state at the time of supplying electric power, the subject is displayed in the imaging monitor in the moving picture mode. This is called a monitor mode. The monitor mode can be used for moving pictures, and the vertically/horizontally-mixed-pixel-reading-out mode in which the pixels are thinned out is applied thereto. In the monitor mode, when a shutter button is pressed for picking up a still picture, the auto-focus of the optical system is activated in the half-pressed state of the button, the shutter button is further pressed down (fully-pressed state) for releasing the shutter when in focus, and the mode is switched to the whole-pixel-reading-out mode for picking up a still picture.

An example of the auto-focus of the related art will be described by referring to FIG. 11.

Step S21 is in a standby state for picking up pictures right after a supply of electric power and it is set in the monitor mode. In step S22, the vertically/horizontally-mixed-pixel-reading-out mode is set. In step S23, it is judged whether it is for recording moving pictures or picking up still pictures. When a person taking pictures selects the mode for recording moving pictures, it is proceeded to step S24. When the person taking pictures selects the mode for picking up still pictures, it is proceeded to step S26. When proceeded to the step S24, the auto-focus is activated for driving the lens of the optical system and, in step S25, moving picture is recorded by the vertically/horizontally-mixed-pixel-reading-out mode through pressing a recording button. In the step S24, auto-focus is carried out by the pixel data which are mixed two-dimensionally in the vertical and horizontal directions. When proceeded to the step S26, the lens of the optical system is driven by rough auto-focus. In step S27, the half-pressed state of the shutter button is judged. In step S28, as in the same manner as that of the step S24, the lens of the optical system is driven by activating the auto-focus by the pixel data which are mixed two-dimensionally in the vertical and horizontal directions. When it is judged in step S29 that it is in focus, the whole-pixel-reading-out mode is set in step S30 and pickup of still pictures is carried out by the whole-pixel-reading-out mode by allowing the shutter button to be fully pressed.

In the related art, the auto-focus in the step S28 is carried out while being still in the vertically/horizontally-mixed-pixel-reading-out mode. In the related art, for picking up still pictures, the vertically/horizontally-mixed-pixel-reading-out mode which is similar to the one used for recording moving pictures is also used at the time of auto-focus control by the monitor mode. That is, the auto-focus is controlled by the pixel data in which pixels are thinned out by mixing the pixels. In other words, the base data for auto-focus is in the state with blank.

However, in general, in the auto-focus, high-band components in signal gain frequency characteristic of the pixel data are taken out through a band-pass filter, and it is judged to be in focus at the peak value.

FIG. 12A shows the frequency characteristic in the horizontal direction, in which the solid line is the frequency characteristic in the case where the pixels are not mixed, and the broken line is the frequency characteristic in the case where the pixels are mixed.

FIG. 12B shows a characteristic of the high-band horizontal high band-pass filter used for the auto-focus. When the pixels are mixed, the high-band information in the horizontal direction is lost.

As a result, in the related art in which the vertically/horizontally-mixed-pixel-reading-out mode is applied at the time of auto-focus control for picking up still pictures, it is not possible to achieve highly accurate auto-focus, following the pixel pitch.

Therefore, the object of the present invention is to provide a solid state image pickup device capable of achieving both modes for recording highly fine moving pictures with smooth movement by high pixels and for picking up highly fine still pictures through highly accurate auto-focus.

SUMMARY OF THE INVENTION

The solid state image pickup device of the present invention comprises a photoelectrical conversion element array and a control unit for controlling reading-out of pixel data from the photoelectrical conversion element array, wherein:

the photoelectrical conversion element array comprises a plurality of photoelectrical conversion elements (pixels) arranged in matrix and each of the pixels generates pixel data by performing photoelectrical conversion on incident light entering through an optical system; and the control unit, at the time of reading out the pixel data from the photoelectrical conversion element array, controls execution of:

a whole-pixel-reading-out mode for picking up still pictures, which outputs the read-out pixel data of the whole pixels in order by a data unit of a single pixel;

a vertically/horizontally-mixed-pixel-reading-out mode for recording moving pictures, which outputs the pixel data after mixing a plurality of pixels in the vertical and horizontal directions of the photoelectrical conversion element array; and a one-directionally-mixed-pixel-reading-out mode for auto-focus, which, at the time of controlling the auto-focus, outputs pixel data mixed in only one direction by canceling mixing of pixel data for a plurality of pixels read out from the photoelectrical conversion element array in either the vertical direction or the horizontal direction of the photoelectrical conversion element array.

There is no need for the pixel-data-reading-out control unit to specifically limit the direction for canceling the mixing of pixels to either the horizontal or vertical direction in the one-directionally-mixed-pixel-reading-out mode. That is:

(1) The pixel data mixed in only vertical direction may be outputted for the auto-focus by canceling the mixing in the horizontal direction of the photoelectrical conversion element array.

(2) The pixel data mixed in only horizontal direction may be outputted for the auto-focus by canceling the mixing in the vertical direction of the photoelectrical conversion element array.

(3) It may have the first and second mixing cancel modes so that the modes can be switched. The first mixing cancel mode is described in (1), in which the pixel data mixed in only vertical direction is outputted for the auto-focus by canceling the mixing in the horizontal direction of the photoelectrical conversion element array, and the second mixing cancel mode is described in (2), in which the pixel data mixed in only horizontal direction is outputted for the auto-focus by canceling the mixing in the vertical direction of the photoelectrical conversion element array.

Further, in the above-described configuration, the photoelectrical conversion element array may be a monochrome type or color type. In the latter case, a plurality of color filters are provided on the front face. Any types of color filters may be used. Bayer pattern of RGB (R is Red, G is green, B is blue), or a complementary color type of cyanogens, magenta, yellow (also green) may be used.

The effects achieved by the above-described configuration of the present invention are as follows.

The operation after completing the auto-focus may be considered similar to that of the related art. That is, at the time of recording moving pictures, the vertically/horizontally-mixed-pixel-data-reading-out mode is set by the pixel-data-reading-out control unit and the pixel data for a plurality of pixels read out from the photoelectrical conversion element array are mixed in the vertical and horizontal directions of the array to be outputted.

That is, the pixel data processing is carried out through thinning out the pixels for increasing the number of frames per unit time. Thereby, highly fine moving pictures with smooth movement can be achieved with high pixels.

Moreover, at the time of picking up still pictures, the whole-pixel-reading-out mode is set by the pixel-data-reading-out control unit and the pixel data of the whole pixels read out from the photoelectrical conversion element array are outputted in order by a unit data of a single pixel. Thereby, highly fine still pictures can be achieved with high pixels.

The present invention is distinctive in the operation performed right before achieving the auto-focus at the time of picking up still pictures. Specifically, a new mode, which is one-directionally-mixed-pixel-reading-out mode, is set by the pixel-data-reading-out control unit.

BRIEF DESCRIPTION OF THE DRAWINGS

The present invention is illustrated be way of example and not limitation in the figures of the accompanying drawings, in which like references indicate similar elements and in which:

FIG. 11 is a flowchart for showing the action of the solid state image pickup device of the related art.

DETAILED DESCRIPTION OF PREFERRED EMBODIMENTS OF THE INVENTION

Figure 1:
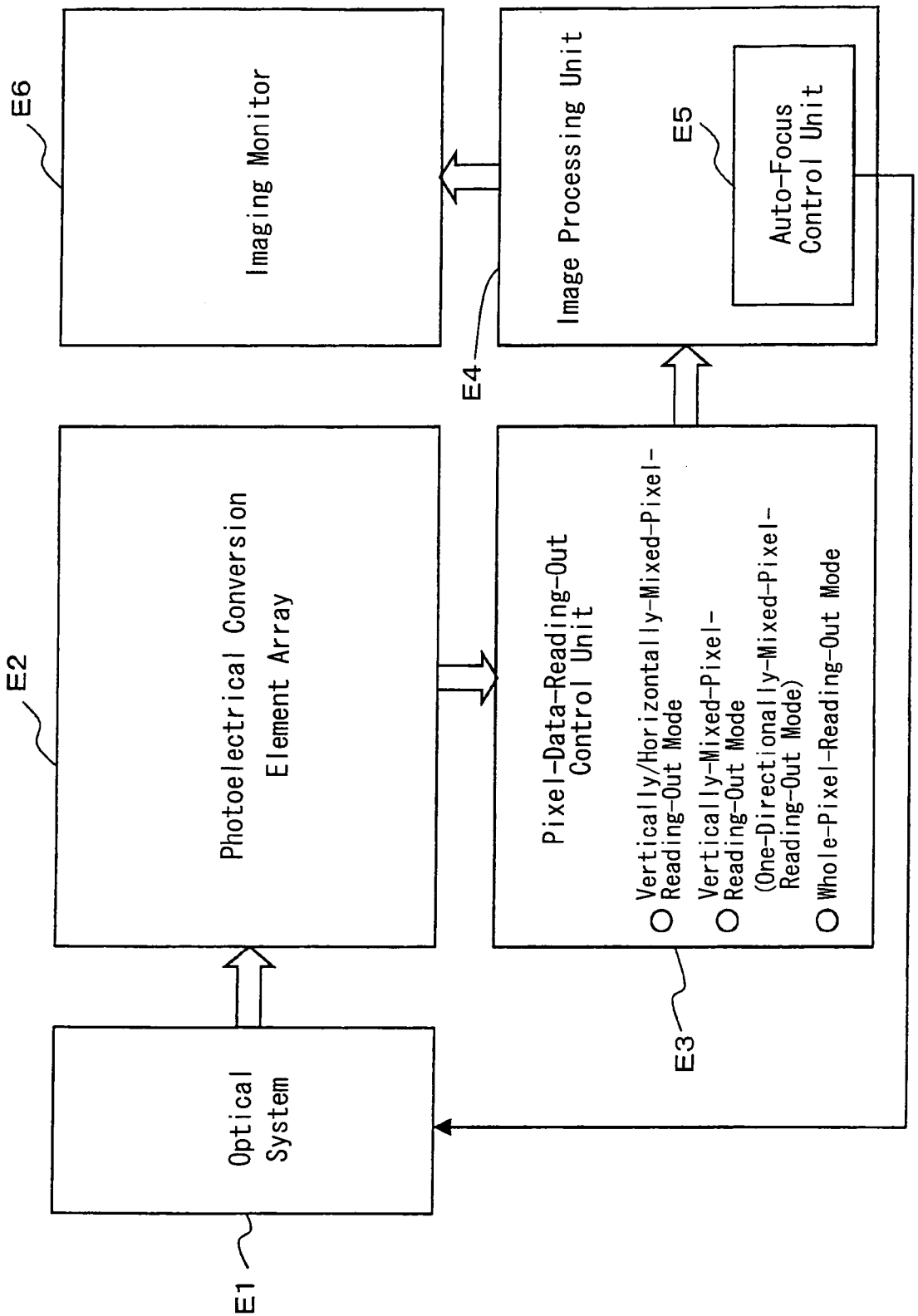
FIG. 1 is a block diagram showing the basic configuration of a solid state image pickup device according to a preferred embodiment of the present invention.

By referring to the accompanying drawings, the solid state image pickup device according to preferred embodiments of the present invention will be described. FIG. 1 is a block diagram showing the configuration of the solid state image pickup device according to the embodiment of the present invention.

In FIG. 1, numeral reference E1 is an optical system which receives an optical image of a subject. The optical system E1 comprises a combination lens formed with a plurality of lenses.

E2 is a photoelectrical conversion element array. The photoelectrical conversion element array E2 comprises a plurality of photoelectrical conversion elements (pixels) arranged in matrix in the vertical and horizontal directions. Further, each pixel generates pixel data, respectively, by converting the incident light entered through the optical system E1 to electric signal by performing photoelectrical conversion. Thereby, the optical image of the subject is formed over the entire portion of the photoelectrical conversion element by the incident light from the optical system E1.

E3 is a pixel-data-reading-out control unit, which reads out the pixel data from the photoelectrical conversion element array E2 and outputs the read-out pixel data by switching the mode. The pixel-data-reading-out control unit E3 controls the execution of mode (1), (2) and also (3).

(1) The whole-pixel-reading-out mode for picking up still pictures:

This is a mode for outputting the read-out pixel data of the whole pixel in order by a unit data of each pixel.

(2) The vertically/horizontally-mixed-pixel-reading-out mode for recording moving pictures:

This is a mode for outputting mixed pixel data after mixing a plurality of read-out data in the vertical and horizontal directions of the array.

(3) The vertically-mixed-reading-out mode:

This is a mode for outputting the vertically-mixed-pixel-data for auto-focus at the time of controlling the auto-focus in the monitor mode by canceling mixing of a plurality of the read-out data in the horizontal direction of the array.

In FIG. 1, E4 is an image processing unit for performing desired data processing upon receiving the pixel data outputted from the pixel-data-reading-out control unit E3. E5 is an auto-focus control unit of the image processing unit E4, and E6 is an imaging monitor such as a liquid crystal display.

Figure 2:
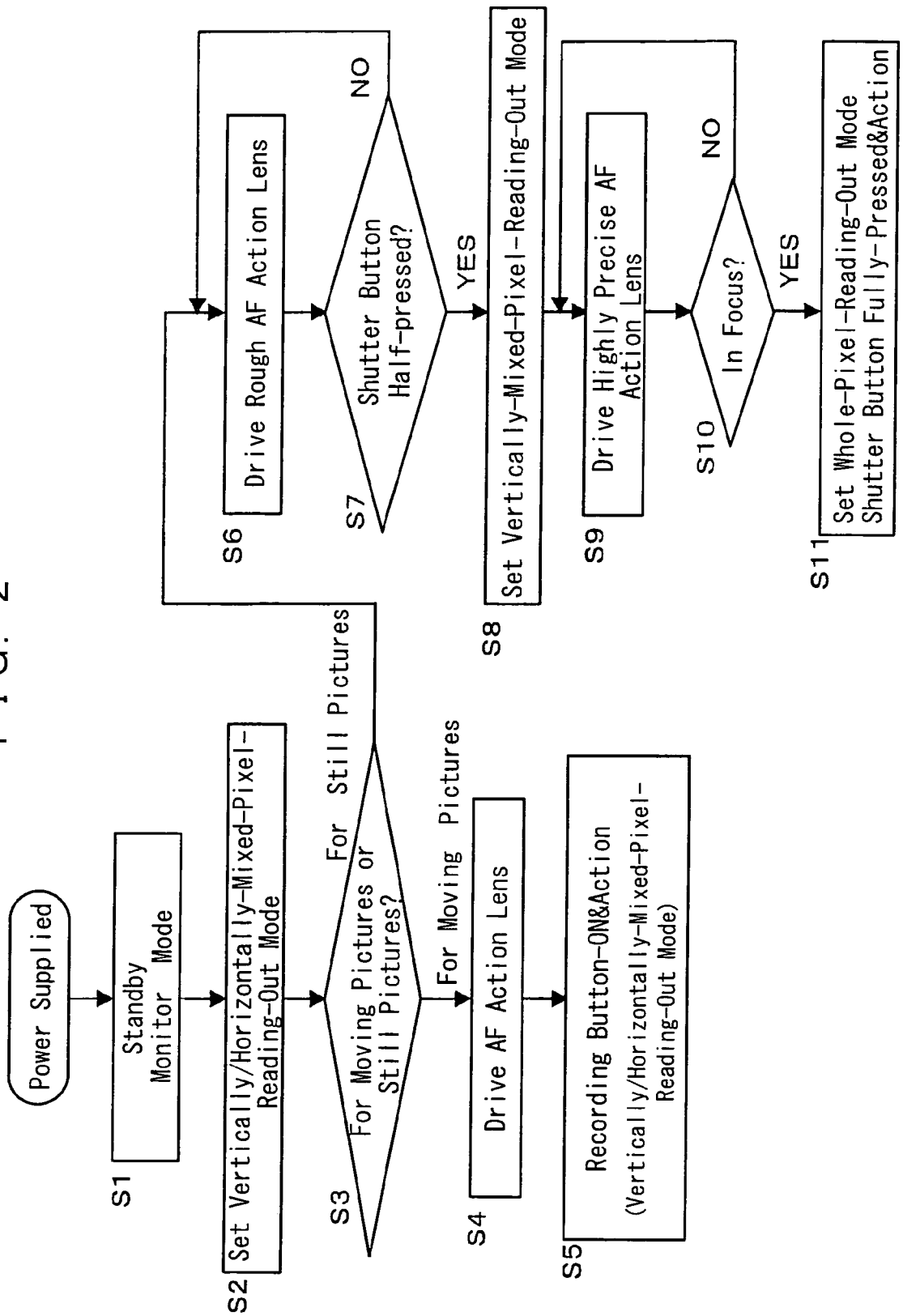
FIG. 2 is a flowchart showing the action of the solid state image pickup device shown in FIG. 1.

By referring to FIG. 2, the action of the above-described solid state image pickup device will be described.

Step S1 is the step for showing the standby state for picking up pictures right after a supply of electric power. In the step S1, the monitor mode is set and, in step S2, the vertically/horizontally-mixed-pixel-reading-out mode is set. The optical image of the subject formed on the photoelectrical conversion element array E2 through the optical system E1 is converted to electric signals by photoelectrical conversion performed on the photoelectrical conversion element array E2.

The specific action up to this point is as follows.

The pixel-data-reading-out control unit E3 reads out the pixel data from the photoelectrical conversion element array E2.

When electric power is supplied, the monitor mode is set, the pixel-data-reading-out control unit E3 is set to be in the vertically/horizontally-mixed-pixel-reading-out mode, and the pixel data of the pixels mixed in the vertical and horizontal directions are outputted to the image processing unit E4.

The image processing unit E4 performs processing of CDS (Correlated Double Sampling) onto the inputted pixel data for removing reset noise and low frequency noise. Further, AGC (Automatic Gain Control) is performed for further converting analog signal to digital data.

Furthermore, the image processing unit E4 outputs the digital data to the imaging monitor E6. Thereby, the image of the subject is displayed in the imaging monitor E6 in real-time.

In step S3, either mode for recording moving pictures or for picking up still pictures is determined. When the person taking pictures selects the mode for recording moving pictures, it is proceeded to step S4, and when the person taking pictures selects the mode for picking up still pictures, it is proceeded to step S6.

In the step S4, the auto-focus is activated for driving the lens of the optical system.

In step S5, moving pictures are recorded by the vertically/horizontally-mixed-pixel-reading-out mode through pressing a recording button. In the step S4, auto-focus is carried out by the pixels mixed two-dimensionally in the vertical and horizontal directions.

In the step S6, the lens of the optical system is driven by rough auto-focus. In step S7, it is judged whether or not the shutter button is in a half-pressed state. After confirming the half-pressed state, it is proceeded to step S8. In the step S8, the vertically-mixed-pixel-reading-out mode is set.

As a result of setting the vertically-mixed-pixel-reading-out mode, the pixel-data-reading-out control unit E3 mixes a plurality of lines of the pixel data in the vertical direction, and outputs the pixel data mixed in only the vertical direction, which is the consecutive pixel data for whole pixels in which the pixels are not thinned out in the horizontal direction, to the image processing unit E4 as the base data for auto-focus.

Then, in step S9, highly precise auto-focus is activated by the vertically-mixed-pixel-reading-out data for driving the optical system E1. In step S10, when it is judged to be in focus, it is proceeded to step S11 for setting the whole-pixel-reading-out mode. Then, the shutter button is allowed to be fully pressed for picking up still pictures by the whole-pixel-reading-out mode.

By referring to FIG. 3 to FIG. 5, the whole-pixel-reading-out mode, the vertically/horizontally-mixed-pixel-reading-out mode, and the vertically-mixed-pixel-reading-out mode will be described.

In the drawings, the left-side shows a part of the photoelectrical conversion element array E2 and the right-side shows the pixel data read out by the pixel-data-reading-out control unit E3. In the photoelectrical conversion element array E2, the first G (green), R (red), B (blue), and the second G (green) are arranged in Bayer pattern.

Figure 3:
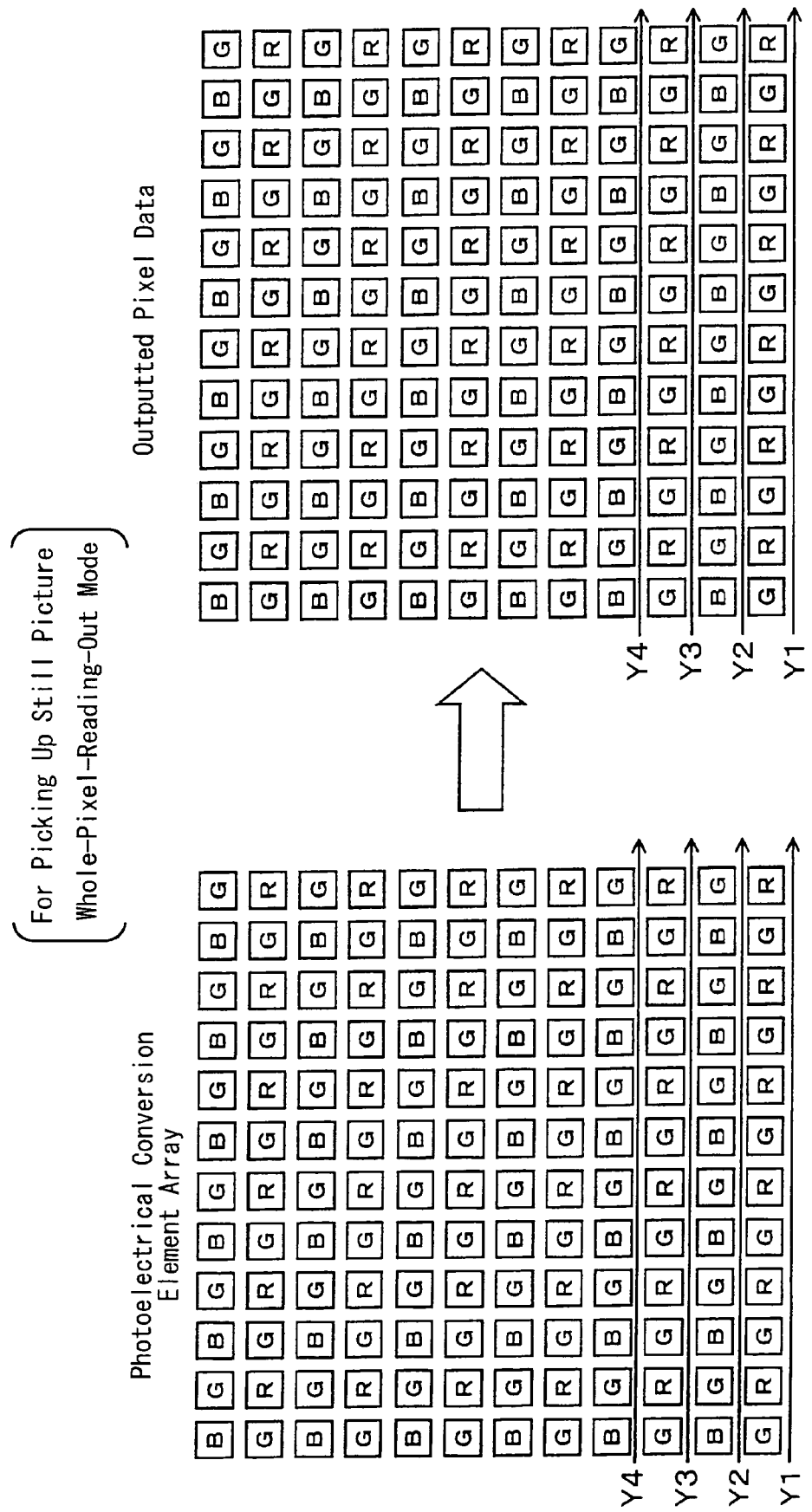
FIG. 3 is a model illustration for describing the action of whole-pixel-reading-out mode of the solid state image pickup device shown in FIG. 1.

FIG. 3 is a model illustration of the whole-pixel-reading-out mode, in which all the pixel data of the whole pixels in the photoelectrical conversion element array E2 are outputted. This is the mode used at the time of picking up still pictures. Scanning is performed in order of Y1, Y2, Y3 - - - . The pixel data for the whole pixels are used so that highly fine still pictures can be picked up with high pixels.

Figure 4:
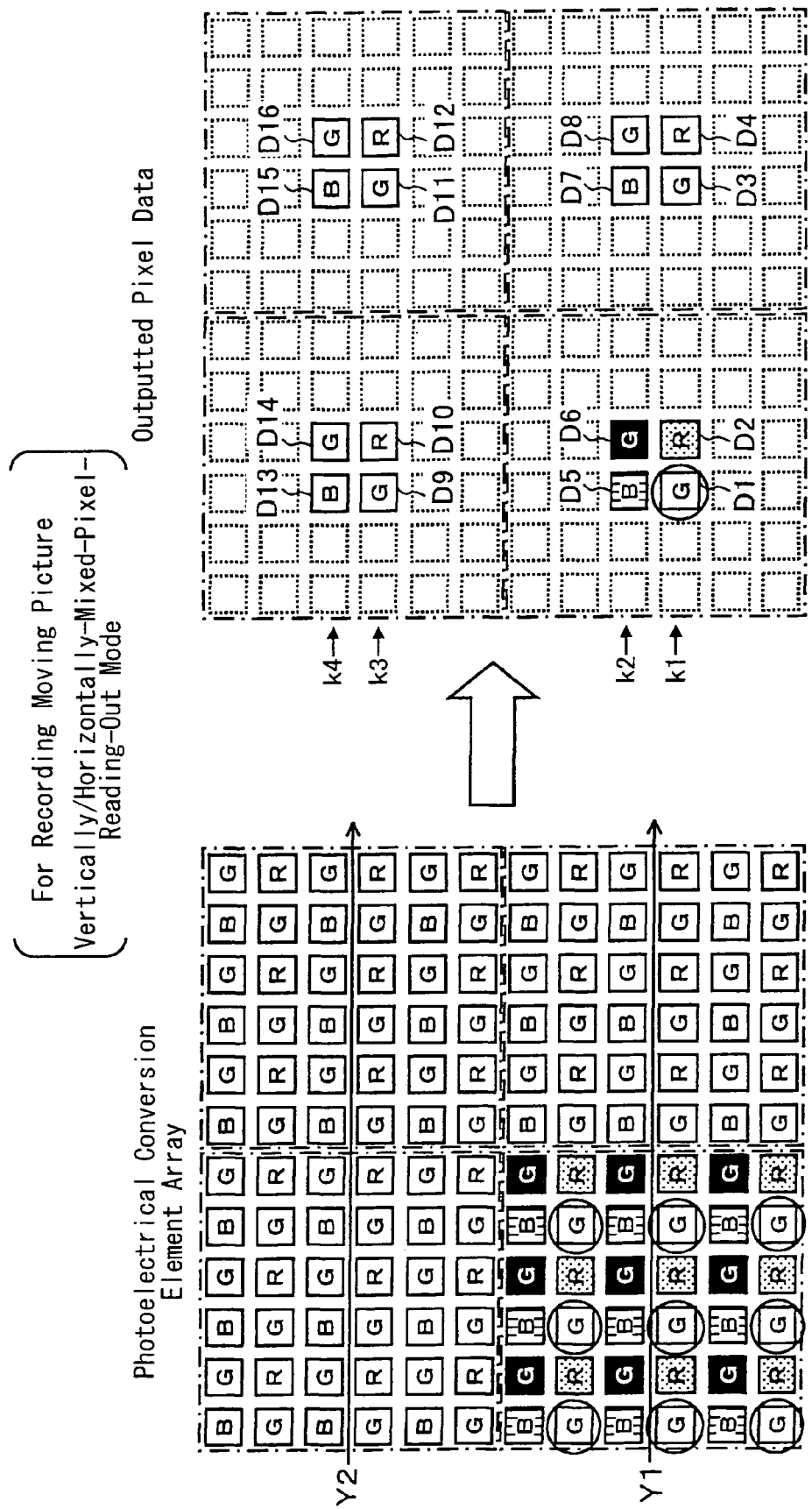
FIG. 4 is a model illustration for describing the action of vertically/horizontally-mixed-pixel-reading-out mode of the solid state image pickup device shown in FIG. 1.

FIG. 4 is a model illustration of the vertically/horizontally-mixed-pixel-reading-out mode. This is a model of the mode used at the time of recording moving pictures.

It shows the state where, with an array of thirty-six pixels in six lines and six rows being one unit, two G (green) pixel data, one R (red) pixel data and one B (blue) pixel data are outputted.

The first G (green) mixed pixel data marked by circle among the pixel data to be outputted is the data in which the pixel data of nine G pixels marked by circles on the photoelectrical conversion element array are mixed.

The R (red) pixel mixed data among the pixel data, which is on the right side of the pixel data marked by circle, is the data in which the nine R (red) pixels on the photoelectrical conversion element array on the right side of the nine pixel data marked by circles are mixed. The B (blue) pixel data among the mixed pixel data, which is on the upper side of the pixel data marked by circle, is the data in which the nine B (blue) pixels on the photoelectrical conversion element array on the upper side, respectively, of the nine pixel data marked by circles are mixed.

The G (green) pixel data among the mixed pixel data, which is diagonal with respect to the pixel data marked by circle, is the data in which the nine G (green) pixels on the photoelectrical conversion element array, which, respectively, are diagonal with respect to the nine pixel data are mixed.

These patterns are repeated with the total of thirty-six arrays in six lines and six rows being one unit.

In the thirty-six pixels of the photoelectrical conversion element array E2, there are eighteen G pixels, and nine R pixels and nine B pixels. As the pixel data, they are turned to be two, one, and one in number, respectively. That is, they are thinned out by ⅓ in the horizontal direction, ⅓ in the vertical direction, thereby being thinned out by ⅑ as a whole. Each of these mixed pixel data is to be outputted from a single channel, totaling four channels, so that it is to be thinned out by ¹⁄₃₆ per channel.

Moreover, the outputted mixed pixel data after being thinned out is similar to the original Bayer pattern, thereby keeping the Bayer pattern. Specifically, the first line (k1) of the mixed pixel data goes G, R, G, R - - -, the second line (k2) goes B, G, B, G - - -, the third line (k3) goes G, R, G, R - - -, and the fourth (k4) line goes B, G, B, G.

The pixel data are outputted by being thinned out by ⅑ two-dimensionally in the horizontal and vertical directions and also by keeping the original Bayer pattern, so that it enables to record highly fine moving picture with smooth movement with high pixels.

Figure 5:
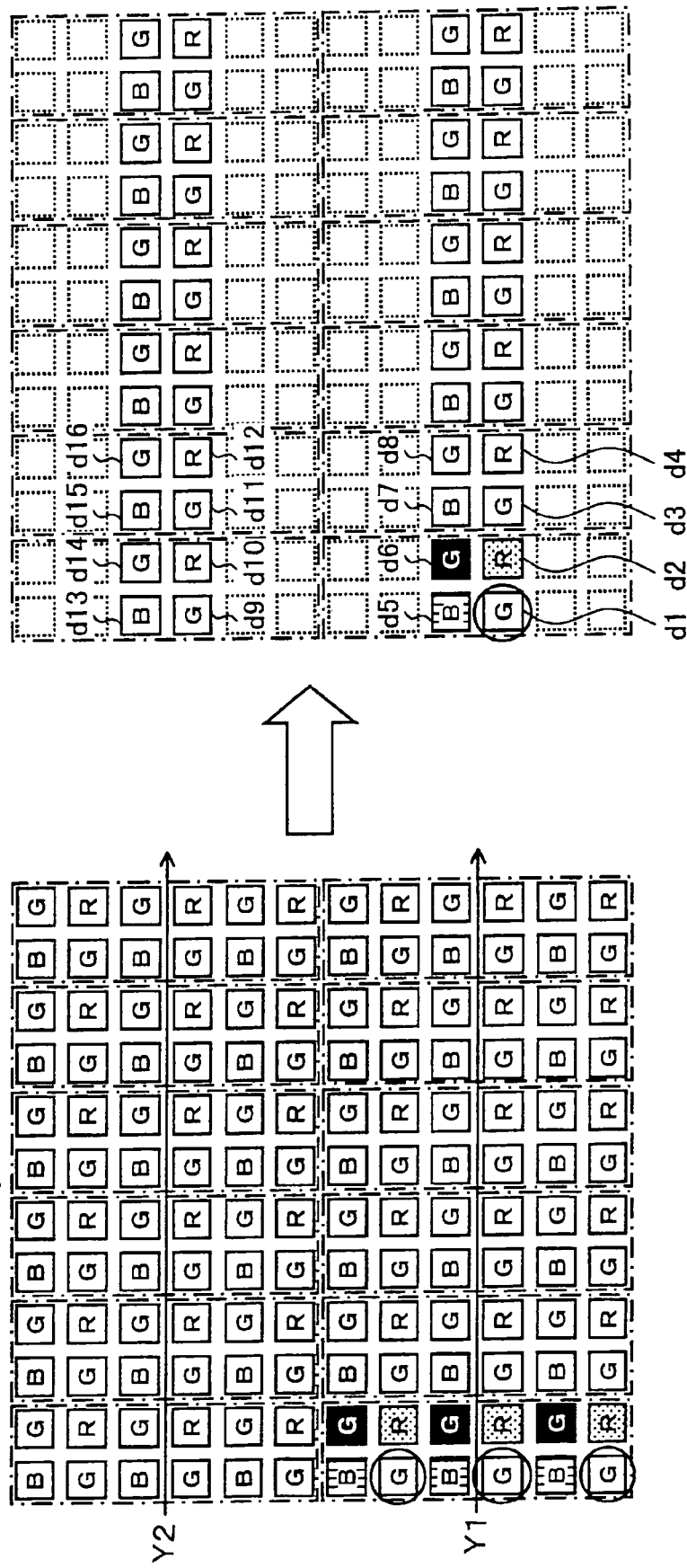
FIG. 5 is a model illustration for describing the action of vertically-mixed-pixel-reading-out mode of the solid state image pickup device shown in FIG. 1.

FIG. 5 is a model illustration of the vertically-mixed-pixel-reading-out mode at the time of controlling the auto-focus in the monitor mode. The pixel data to be outputted are thinned out in the vertical direction but are not thinned out in the horizontal direction. Thus, the pixel data are to be outputted in the state where the whole pixels are continuous in the horizontal direction.

At this time, two G pixel data and one R and B pixel data each are outputted with an array of twelve pixels in six lines and two rows being a single unit.

The pixel data of the first G (green) marked by circle mixed in only one direction is the pixel data in which the three G pixels marked by circles on the photoelectrical conversion element are mixed.

The pixel data of the R (red) marked by circle mixed in only one direction is the pixel data in which the three R pixels, which are on the right side of the pixel data marked by circles on the photoelectrical conversion element, are mixed.

The pixel data of the B (blue) marked by circle mixed in only one direction is the pixel data in which the three B pixels, which are on the upper side of the pixel data marked by circles on the photoelectrical conversion element, are mixed.

The pixel data of the second G (green) marked by circle mixed in only one direction is the pixel data in which the three G pixels, which are diagonal to the pixel data marked by circles on the photoelectrical conversion element, are mixed.

These patterns are repeated with an array of twelve pixels in six lines and two rows being a single unit. Scanning is performed in order of Y1, Y2 - - - . Bayer pattern is also held at this time.

In the vertically-mixed-pixel-data-reading0 out mode, the pixel data are thinned out in the vertical direction. However, there is no thinning out in the horizontal direction so that the pixel data of the whole pixel in the horizontal direction are continuously outputted.

That is, in the horizontal direction, the base data for the auto-focus with no missing information is generated and the control of the auto-focus is carried out using this data.

Figure 12A:
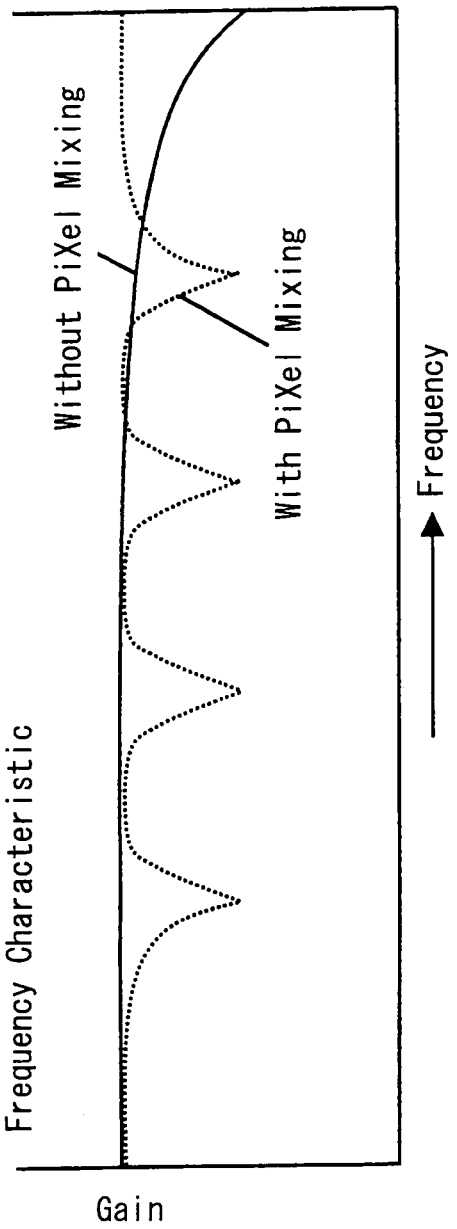
FIG. 12 is a frequency characteristic figure of the pixel data and a band-pass filter.
Figure 12A:
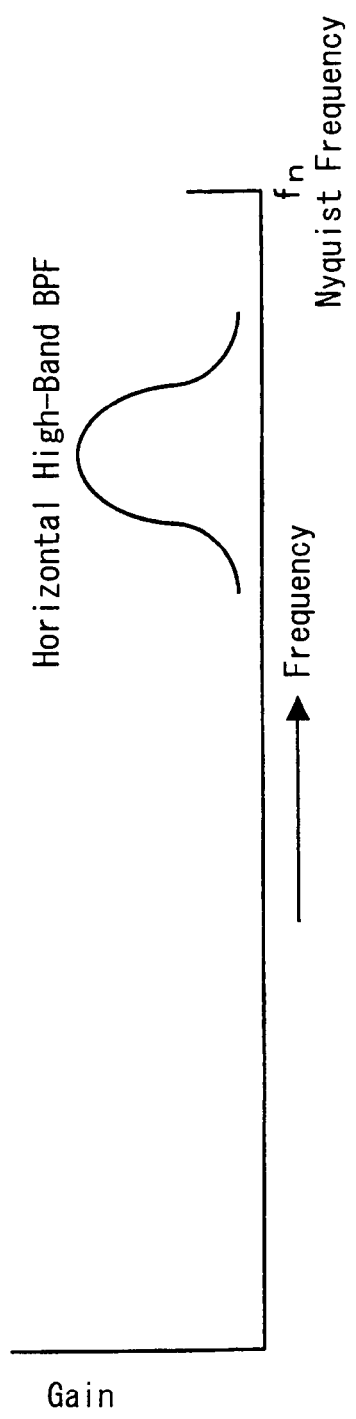

The auto-focus is controlled by using the horizontal high band-pass filter with a characteristic shown in FIG. 12B for the frequency characteristic in the horizontal direction in the case of no pixel mixing as shown in FIG. 12A by a solid line. The high-band information in the horizontal direction is retained.

As described, after achieving the highly precise auto-focus following the pixel pitch, highly fine still pictures with high pixels are picked up as shown in FIG. 3. Thus, the still picture data obtained thereby become the highly fine data with remarkably higher quality compared to the related art in which vertically/horizontally-mixed-pixel-data-reading-out mode is applied at the time of controlling the auto-focus.

Figure 6:
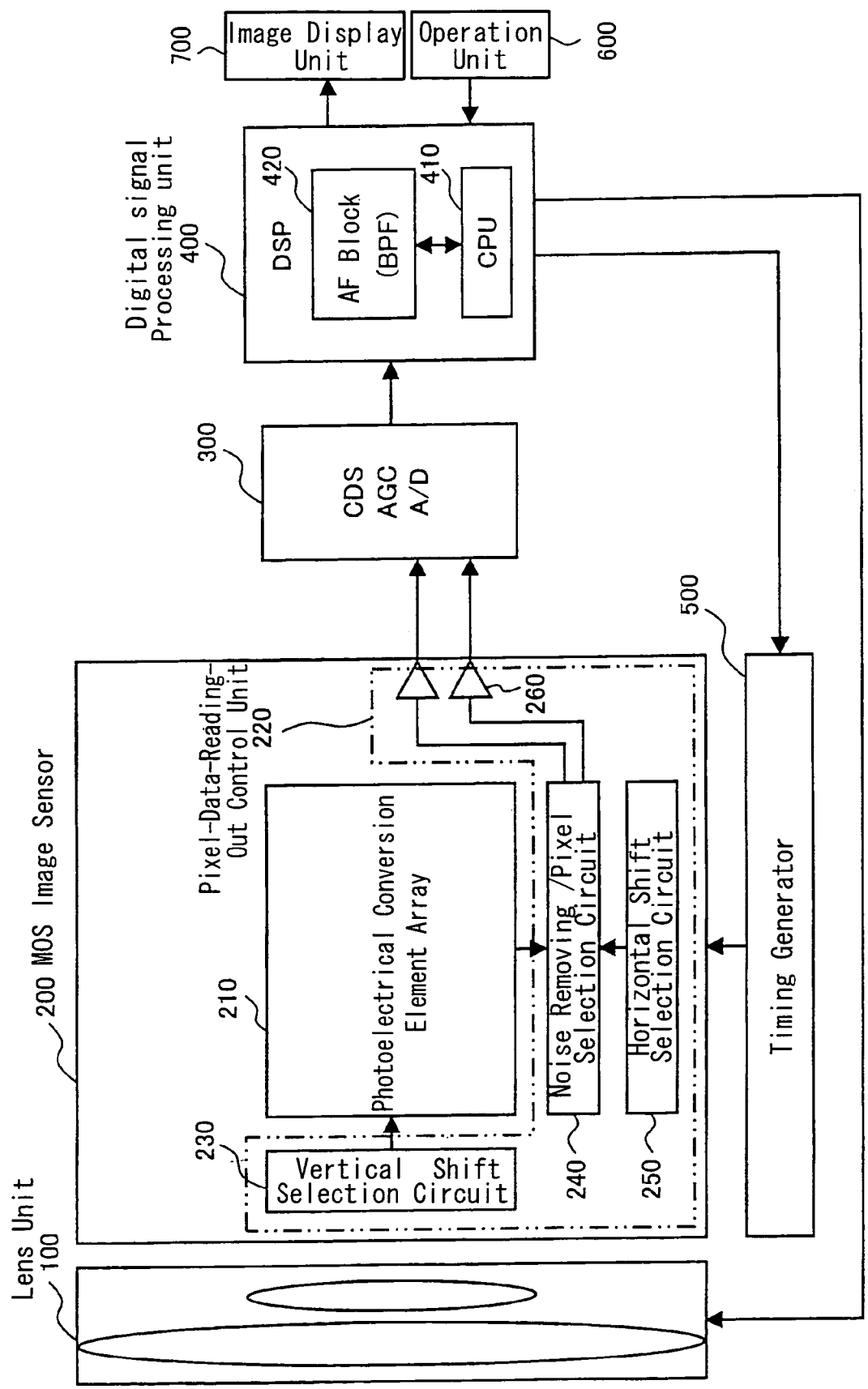
FIG. 6 is a block diagram for showing the configuration of the solid state image pickup device shown in FIG. 1 in detail.

FIG. 6 is an illustration for more specifically showing the configuration of FIG. 1 described above.

In FIG. 6, numeral reference 100 is a lens unit, 200 is a MOS image sensor, 300 is a CDS-AGC-A/D processing unit, 400 is a digital signal processing unit, 500 is a timing generator, 600 is an operation unit, and 700 is a screen display unit.

The lens unit 100 corresponds to the optical system E1. The MOS image sensor 200 comprises an photoelectrical conversion element array 210 and a pixel-data-reading-out control unit 220. The photoelectrical conversion element array 210 corresponds to the photoelectrical conversion element array E2, and the pixel-data-reading-out control unit 220 corresponds to the pixel-data-reading-out control unit E3.

The pixel-data-reading-out control unit 220 comprises a vertical shift selection circuit 230, a noise removing/pixel selection circuit 240, a horizontal shift selection circuit 250, and an output amplifier 260.

The output amplifier 260 may have one channel or two channels. The CDS-AGC-A/D processing unit 300 and the digital signal processing unit 400 correspond to the imaging processing unit E4. The digital processing unit 400 comprises a CPU 410 and an AF block 420.

Figure 7:
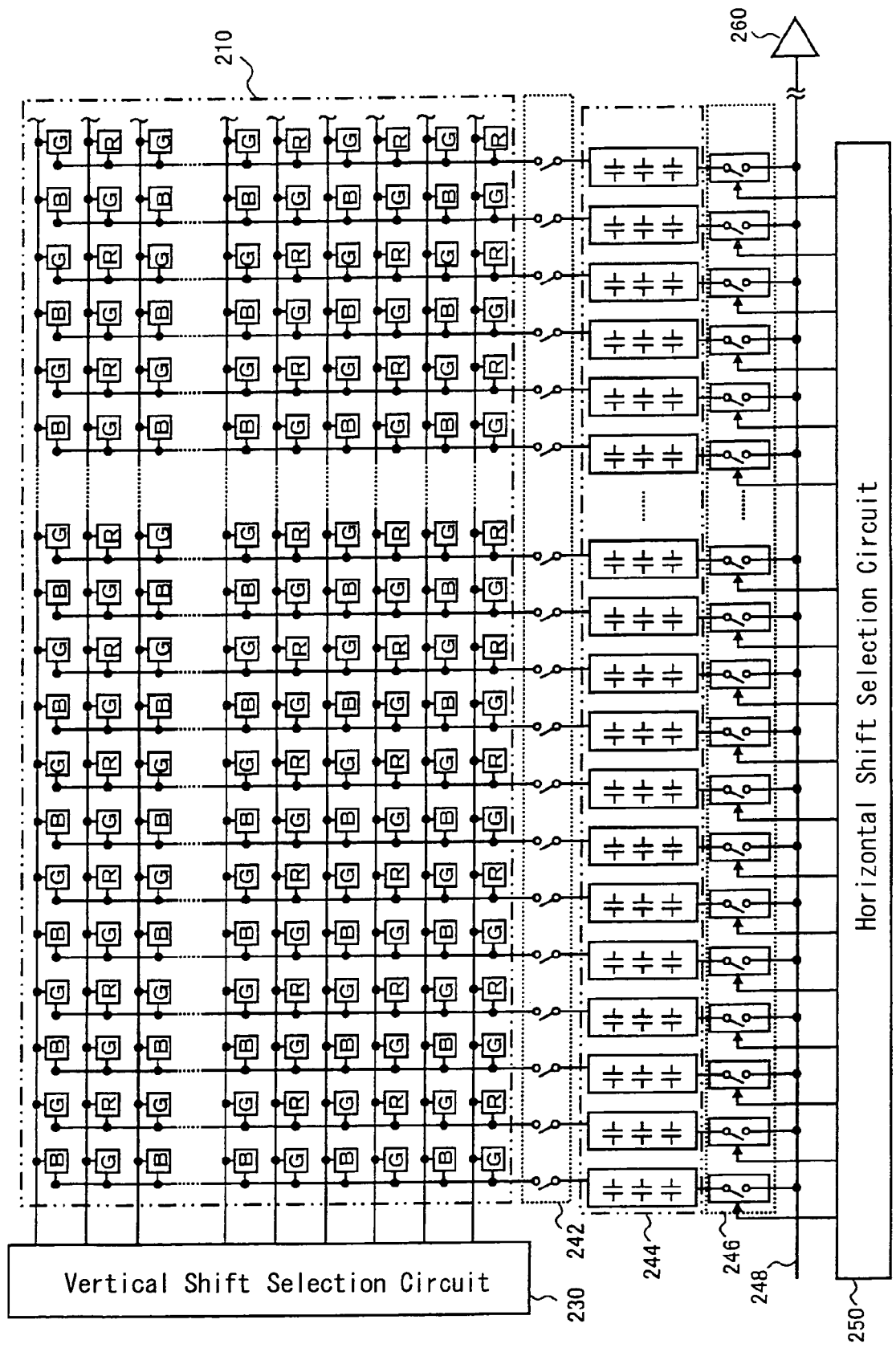
FIG. 7 is a circuit diagram showing the specific configuration of a noise removing/pixel selection circuit of the solid state image pickup device shown in FIG. 1.

FIG. 7 is a block diagram showing the more specific configuration of the noise removing/pixel selection circuit 240. In FIG. 7, numeral reference 242 is a vertical transfer switch circuit, 244 is a signal voltage holding circuit, 246 is a horizontal transfer switch circuit, and 248 is a signal output line.

Figure 8:
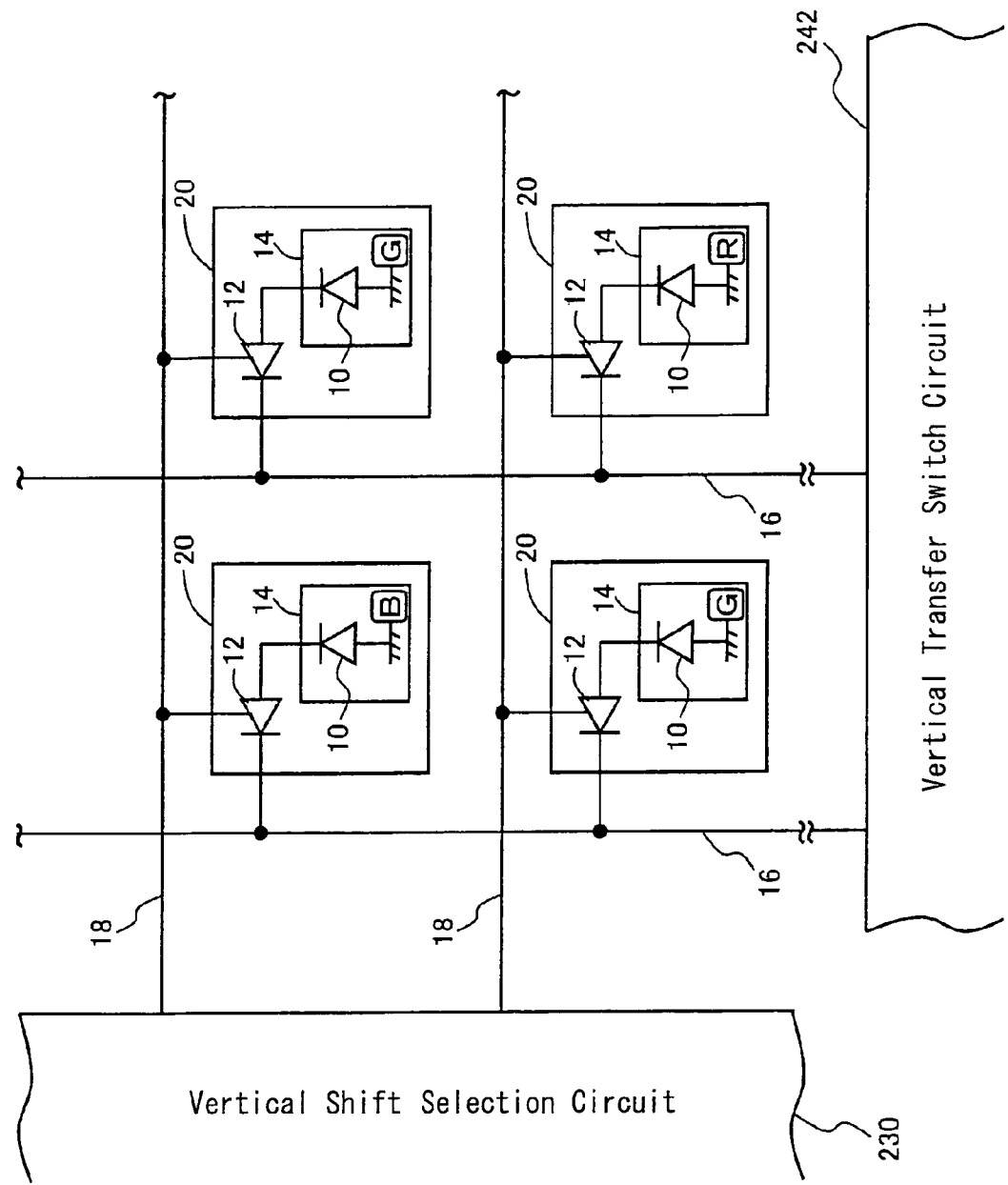
FIG. 8 is an enlarged circuit diagram showing a part of a photoelectrical conversion element array of the solid state image pickup device shown in FIG. 1.

FIG. 8 is a partly-taken-out enlarged view of the photoelectrical conversion element array 210. A single pixel 20 comprises a photodiode 10, a cell amplifier 12, and a color filter 14. The anode of the photodiode is earthed, the cathode is inputted to the cell amplifier 12, and the output of the cell amplifier 12 is connected to the pixel-data-reading-out line 16 in the longitudinal direction. The control terminal of the cell amplifier 12 is connected to a scanning line 18 from the vertical shift selection circuit 230.

The color filter 14 is disposed in front of the photodiode 10. The color filter 14 is configured to form a Bayer pattern (G, R, B, G) with four pixels as a pair. As a unit with four pixels in two lines and two rows, the first G (green) and R (red), and B (blue) and the second G (green) are lined in the horizontal direction, while the first G (green) and B (blue), and R (red) and the second G (green) are lined in the vertical direction. Large numbers of the units of four pixels are arranged in crosswise matrix form.

(Whole-pixel-reading-out Mode)

Figure 9:
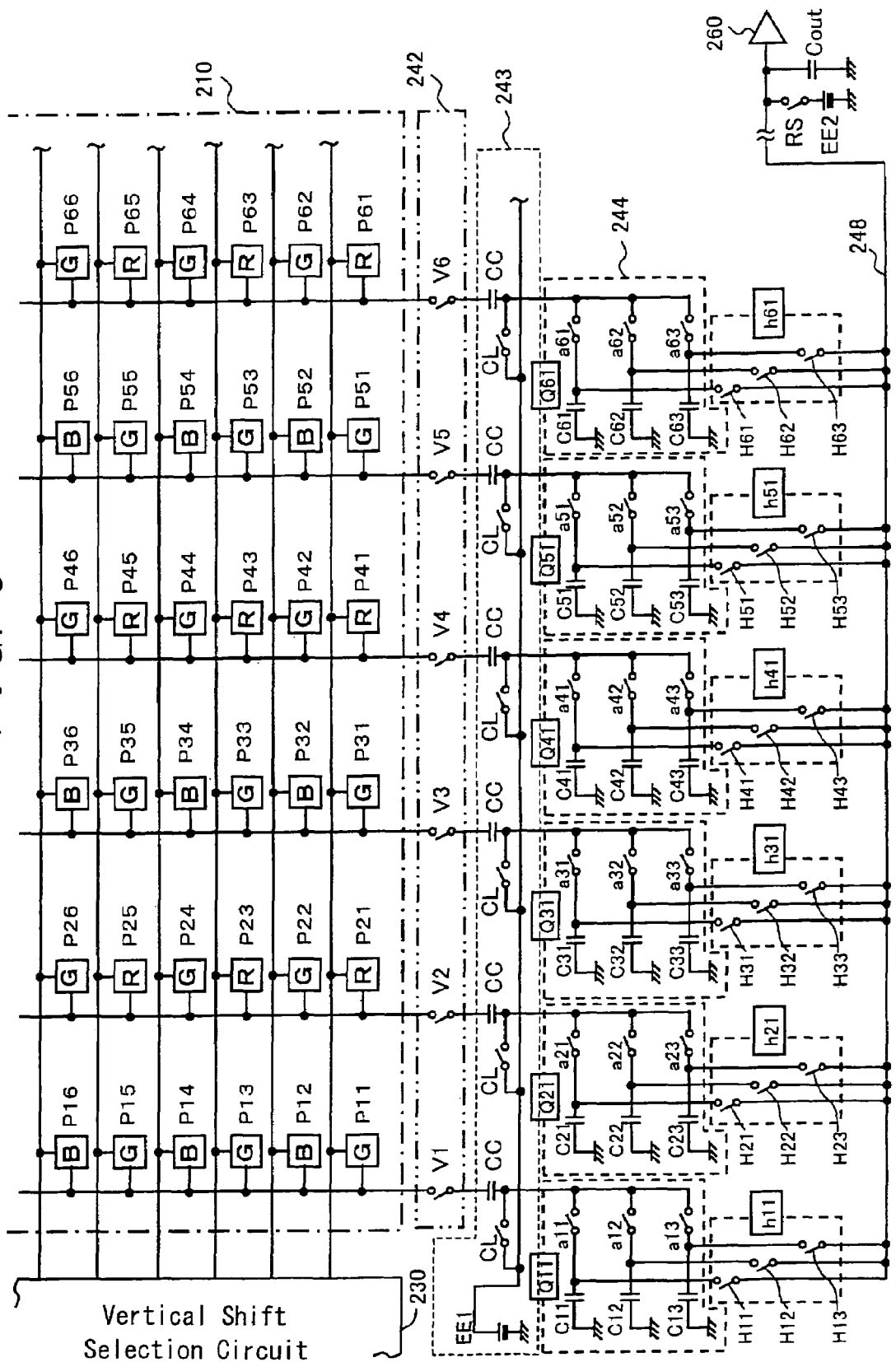
FIG. 9 is an enlarged circuit diagram of the circuit configuration part of the solid state image pickup device shown in FIG. 1, which is for reading out the pixel data.

The action of the whole-pixel-reading-out mode will be described by referring to FIG. 9. FIG. 9 is an enlarged view of the circuit configuration part for reading out the pixel data. FIG. 9 shows the case of using the output amplifier 260 with one channel.

In FIG. 9, a noise removing circuit 243 is also illustrated (not shown in FIG. 7).

Reset and noise removal for one line of pixels using a clamp switch CL is carried out by the reference potential of the cell amplifier after selecting the line within the horizontal blanking period. Then, the signal voltage is read out and maintained.

At the initial stage of reading out the pixel by a single pixel unit, a reset switch RS is once closed for resetting a signal output condenser Cout to VDD level of reset power source EE2. After the reset, the reset switch RS is opened.

The clamp switches CL are once closed and all clamp condensers CC are reset. After the reset, the clamp switches CL are opened.

The first line of the photoelectrical conversion element array 230 is selected by the vertical shift selection circuit 230. At this time, the clamp switches CL of the noise removing circuit 243 are once closed and all the clamp condensers CC are reset.

After the reset, the clamp switches CL are opened and then all vertical transfer switches V1, V2, V3 - - - are simultaneously closed. At the same time, all transmission switches a11, a21, a23 - - - are simultaneously closed for charging the voltage signal of pixels P11, P21, P31 to each of condensers Q11, Q21, Q31 - - - (each voltage is charged to all of the three condensers, however, may be charged to one of the condensers only).

Subsequently, horizontal transfer switches h11, 121, h31 - - - are closed in order (at this time, reset is carried out by each pixel unit by the reset switch RS), and the pixel data of the whole pixels for one line are outputted through the signal output condenser Cout and the output amplifier 260.

That is, first, the first horizontal transfer switch h11 (all of the three switches H11, H12, H13) is once closed, and the pixel data of the pixel P11 in the first line and first row held in the condenser Q11 is outputted through the output condenser Cout and the output amplifier 260.

Then, the second horizontal transfer switch h21 (all of the three switches H21, H22, H23) is once closed, and the pixel data of the pixel P21 in the first line and second row held in the condenser Q21 is outputted.

Subsequently, the third horizontal transfer switch h31 (all of the three switches H31, H32, H33) is once closed, and the pixel data of the pixel P31 in the first line and third row held in the condenser Q31 is outputted.

Hereinafter, the horizontal transfer switches h41, h51, h61 - - - are closed in order and the pixel data of the pixels P41, P51, P61 - - - in the first line and fourth row, fifth row, sixth row - - - , which are held in the condenser Q41, Q51, Q61 - - - are outputted in the same manner.

As described above, the pixel data of the whole pixels in the first line are outputted.

After completion of reading-out the pixel data of the whole pixels in the first line, it then shifts to reading-out of the pixels in the second line, after canceling the noise.

That is, through applying the clamp direct current power source EE1 by closing the clamp switches CL, all the clamp condensers CC are reset to the initial potential.

The pixels are formed by a combination of the photodiode and the cell amplifier (floating-diffusion amplifier). The electric potential accumulated in the photodiode is outputted in a form of voltage through the cell amplifier.

There is a difference between the threshold values of the voltages VT of the transistors of the cell amplifier, which becomes the offset component for deteriorating the picture quality (for example, generating vertical lines). This is called a noise and it is a role of the noise removing circuit 243 to cancel the noise.

As the clamp condenser, MOS gate capacity can be used. After resetting the clamp condenser, the clamp switches CL are released and the operation is shifted to read out the pixel data of the next scanning unit.

For reading out the pixel data in the next line, the selected line is shifted by one by the vertical shift selection circuit 230. The same operation as described above is repeated thereafter. The pixel data of the whole pixels for one line are read out in order.

Then, after shifting the selected line by one line, the pixel data of the whole pixels for each line are read out in order and this is repeated until the last line. Thereby, the whole pixel data of one frame are read out.

(Nine-mixed-pixel-reading-out Mode)

The first line of the photoelectrical conversion element array 210 is selected by the vertical shift selection circuit 230. At this time, all vertical transfer switches V1, V2, V3 - - - are simultaneously closed, and the clamp condensers CC are reset to the VT reference potential of the cell amplifier through the ON-OFF operation of the clamp switch CL.

Then, the signal voltages of all the cell amplifiers are outputted for simultaneously closing the vertical transfer switches V1, V2, V3 - - - . At the same time, each of the first transmission switches a11, a21, a31 - - - is simultaneously closed for charging the signal voltage of the pixels P11, P21, P31 - - - in the first line to the first condensers C11, C21, C31 - - - , respectively.

Then, the clamp condensers CC are reset through the ON-OFF operation of the clamp switch CL.

Subsequently, the vertical shift selection circuit 230 skips one line and selects the third line.

All the vertical transfer switches V1, V2, V3 - - - are simultaneously closed and, this time, each of second transmission switches a12, a22, a32 - - - is simultaneously closed for charging the voltage signal of the pixels P13, P23, P33 - - - in the third line to the second condensers C12, C22, C32 - - - , respectively. Then, as in the same manner as described above, the clamp condensers CC are reset once again.

Then, the vertical shift selection circuit 230 skips one line and selects the fifth line. All the vertical transfer switches V1, V2, V3 - - - are simultaneously closed and, this time, each of third transmission switches a13, a23, a33 - - - is simultaneously closed for charging the voltage signal of the pixels P15, P25, P35 - - - in the fifth line to the third condensers C13, C23, C33 - - - , respectively. Then, as in the same manner as described above, the clamp condensers CC are reset once again.

Thereby, when looking at the group of pixels from the first to six rows in the first line, third line, fifth line, the pixel data of the three G (green) pixels in the first row are held by the condensers C11, C12, C13, respectively, the pixel data of the three R (red) pixels in the second row are held by the condensers C21, C22, C23, respectively, the pixel data of the three G (green) pixels in the third row are held by the condensers C31, C32, C33, respectively, the pixel data of the three R (red) pixels in the fourth row are held by the condensers C41, C42, C43, respectively, the pixel data of the three G (green) pixels in the fifth row are held by the condensers C51, C52, C53, respectively, and the pixel data of the three R (red) pixels in the sixth row are held by the condensers C61, C62, C63, respectively. The same relation is being established in other rows as well.

The nine pixels in the first, third, fifth line and the first, third, fifth rows are all G (green) pixels and the pixel data thereof are held by the condensers C11, C12, C13, C31, C32, C33, C51, C52, C53. Thus, by charging the signal output condensers Cout through simultaneously operating the nine horizontal transfer switches H11, H12, H13, H31, H32, H33, H51, H52, H53 corresponding to the nine condensers, the pixel data of the nine G (green) pixels are mixed. After mixing the nine pixels, the mixed pixel data of nine G pixels is outputted from the output amplifier 260. This corresponds to the nine-G-mixed pixel data D1 in FIG. 4.

Meanwhile, the nine pixels in the first, third, fifth line and the second, fourth, sixth rows are all R (red) pixels and the pixel data thereof are held by the condensers C21, C22, C23, C41, C42, C43, C61, C62, C63. Thus, after reading out the nine-pixel data of nine G (green) pixels as described above, by charging the signal output condensers Cout through simultaneously operating the nine horizontal transfer switches H21, H22, H23, H41, H42, H43, H61, H62, H63 corresponding to the nine condensers, the pixel data of the nine R (red) pixels are mixed. After mixing the nine pixels, the mixed pixel data of nine R pixels is outputted from the output amplifier 260. This corresponds to the nine-R-mixed pixel data D2 in FIG. 4.

Although not shown in the figures, by simultaneously operating the nine horizontal transfer switches corresponding to the condensers C71, C72, C73, C91, C92, C93, C111, C112, C113, the mixed pixel data of next nine G pixels is outputted from the output amplifier 260. This corresponds to the nine-G-mixed pixel data D3 in FIG. 4.

Further, by simultaneously operating the nine horizontal transfer switches corresponding to the condensers C81, C82, C83, C101, C102, C103, C121, C122, C123, the mixed pixel data of next nine R pixels is outputted from the output amplifier 260. This corresponds to the nine-R-mixed pixel data D4 in FIG. 4.

After completing the output of the pixel data of G, R, G, R - - - for one line under the state where the pixels are thinned out, the vertical shift selection circuit 230 shifts the selected line by one line, and the same operation as described above is repeated. Thereby, the nine-B-mixed pixel data D5, the nine-G-mixed pixel data D6, the nine-B-mixed pixel data D7, the nine-G-mixed pixel data D8 and the like as shown in FIG. 4 are outputted.

After completing the output of the pixel data of B, G, B, G - - - for one line under the state where the pixels are thinned out, the vertical shift selection circuit 230 shifts the selected line by five lines, and the same operation as described above is repeated. Thereby, the nine-G-mixed pixel data D9, the nine-R-mixed pixel data D10, the nine-G-mixed pixel data D11, the nine-R-mixed pixel data D12 and the like as shown in FIG. 4 are outputted.

After completing the output of the pixel data of G, R, G, R - - - for one line under the state where the pixels are thinned out, the vertical shift selection circuit 230 shifts the selected line by one line, and the same operation as described above is repeated. Thereby, the nine-B-mixed pixel data D13, the nine-G-mixed pixel data D14, the nine-B-mixed pixel data D15, the nine-G-mixed pixel data D16 and the like as shown in FIG. 4 are outputted.

(Vertically-mixed-pixel-reading-out Mode)

The operation for charging the pixel data which is read out by the vertically-mixed-pixel-reading-out mode to the condensers is the same as that of the nine-mixed-pixel-reading-out mode.

That is, all the vertical transfer switches V1, V2, V3 - - - are simultaneously closed and each of the first transmission switches a11, a21, a31 - - - is simultaneously closed for charging the voltage signal of the pixels P11, P21, P31 - - - in the first line to the first condensers C11, C21, C31 - - - , respectively. Then, the clamp condensers CC are reset once again through ON-OFF operation of the clamp switch CL.

Subsequently, the vertical shift selection circuit 230 skips one line and selects the third line. All the vertical transfer switches V1, V2, V3 - - - are simultaneously closed and, this time, each of second transmission switches a12, a22, a32 - - - is simultaneously closed for charging the voltage signal of the pixels P13, P23, P33 - - - in the third line to the second condensers C12, C22, C32 - - - , respectively. Then, the clamp condensers CC are reset once again.

Then, the vertical shift selection circuit 230 by skips one line and selects the fifth line.

All the vertical transfer switches V1, V2, V3 - - - are simultaneously closed and, this time, each of third transmission switches a13, a23, a33 - - - is simultaneously closed for charging the voltage signal of the pixels P15, P25, P35 - - - in the fifth line to the third condensers C13, C23, C33 - - - , respectively.

Then, the clamp condensers CC are reset once again.

Thereby, when looking at the group of pixels from the first to six rows in the first line, third line, fifth line, the pixel data of the three G (green) pixels in the first row are held by the condensers C11, C12, C13, respectively, the pixel data of the three R (red) pixels in the second row are held by the condensers C21, C22, C23, respectively, the pixel data of the three G (green) pixels in the third row are held by the condensers C31, C32, C33, respectively, the pixel data of the three R (red) pixels in the fourth row are held by the condensers C41, C42, C43, respectively, the pixel data of the three G (green) pixels in the fifth row are held by the condensers C51, C52, C53, respectively, and the pixel data of the three R (red) pixels in the sixth row are held by the condensers C61, C62, C63, respectively. The same relation is being established in other rows as well.

It is the same as the case of the vertically/horizontally-mixed-data-reading-out mode up to this point.

The three pixels in the first, third, fifth line and the first row are all G (green) pixels and the pixel data thereof are held by the condensers C11, C12, C13.

Thus, by charging the signal output condensers Cout through simultaneously operating the three horizontal transfer switches H11, H12, H13 corresponding to the condensers, the pixel data of the three G (green) pixels are mixed. After mixing the three pixels, the mixed pixel data of three G pixels is outputted from the output amplifier 260.

This corresponds to the three-G-mixed pixel data d1 in FIG. 5.

The three pixels in the first, third, fifth line and the second row are all R (red) pixels and the pixel data thereof are held by the condensers C21, C22, C23.

Thus, by charging the signal output condensers Cout through simultaneously operating the three horizontal transfer switches H21, H22, H23 corresponding to the condensers, the pixel data of the three R (red) pixels are mixed. After mixing the three pixels, the mixed pixel data of three R pixels is outputted from the output amplifier 260.

This corresponds to the three-R-mixed pixel data d2 in FIG. 5.

The three pixels in the first, third, fifth line and the third row are all G (green) pixels and the pixel data thereof are held by the condensers C31, C32, C33.

Thus, by charging the signal output condensers Cout through simultaneously operating the three horizontal transfer switches H31, H32, H33 corresponding to the condensers, the pixel data of the three G (green) pixels are mixed. After mixing the three pixels, the mixed pixel data of three G pixels is outputted from the output amplifier 260.

This corresponds to the three-G-mixed pixel data d3 in FIG. 5.

The three pixels in the first, third, fifth line and the fourth row are all R (red) pixels and the pixel data thereof are held by the condensers C41, C42, C43.

Thus, by charging the signal output condensers Cout through simultaneously operating the three horizontal transfer switches H41, H42, H43 corresponding to the condensers, the pixel data of the three R (red) pixels are mixed. After mixing the three pixels, the mixed pixel data of three R pixels is outputted from the output amplifier 260.

This corresponds to the three-R-mixed pixel data d4 in FIG. 5.

After completing the output of the pixel data of G, R, G, R - - - for one line under the state where the pixels are thinned out only in the vertical direction while the whole pixels in the horizontal direction are being selected, the vertical shift selection circuit 230 shifts the selected line by one line, and the same operation as described above is repeated. Thereby, the three-B-mixed pixel data d5, the three-G-mixed pixel data d6, the three-B-mixed data d7, the three-G-mixed pixel data d8 and the like as shown in FIG. 5 are outputted.

After completing the output of the pixel data of B, G, B, G - - - for one line under the state where the pixels are thinned out in the vertical direction while the whole pixels in the horizontal direction are being selected, the vertical shift selection circuit 230 shifts the selected line by five lines, and the same operation as described above is repeated. Thereby, the three-G-mixed pixel data d9, the three-R-mixed pixel data d10, the three-G-mixed pixel data d11, the three-R-mixed pixel data d12 and the like as shown in FIG. 5 are outputted.

After completing the output of the pixel data of G, R, G, R - - - for one line under the state where the pixels are thinned out in the vertical direction while the whole pixels in the horizontal direction are being selected, the vertical shift selection circuit 230 shifts the selected line by one line, and the same operation as described above is repeated. Thereby, the three-B-mixed pixel data d13, the three-G-mixed pixel data d14, the three-B-mixed pixel data d15, the three-G-mixed pixel data d16 and the like as shown in FIG. 5 are outputted.

Again, in the vertically-mixed-pixel-reading-out mode, the pixels are thinned out in the vertical direction, however, there is no thinning out in the horizontal direction so that the pixel data of the whole pixels are continuously outputted in the horizontal direction. That is, the base data with no missing information is generated in the horizontal direction and the auto-focus is controlled using this data.

As described, after achieving the highly precise auto-focus following the pixel pitch, highly fine still pictures with high pixels are picked up as shown in FIG. 3. Thus, the still picture data obtained thereby become the highly fine data with remarkably higher quality compared to the related art in which vertically/horizontally-mixed-pixel-data-reading-out mode is applied at the time of controlling the auto-focus.

Figure 10:
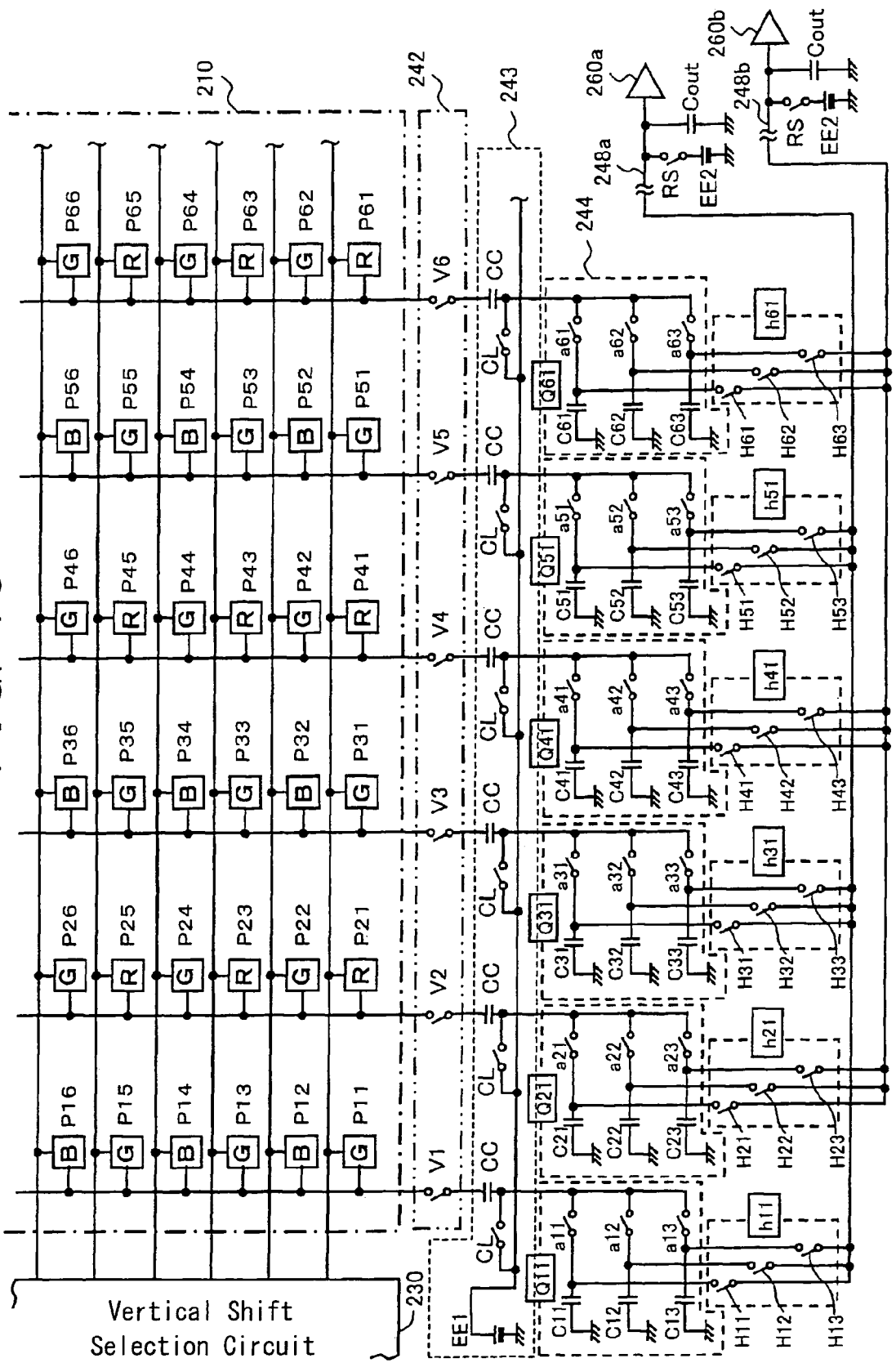
FIG. 10 is an enlarged circuit diagram showing the circuit configuration part of a solid state image pickup device according to another embodiment of the present invention, which is for reading out the pixel data.

In the above description, the case of using the output amplifier 260 with one channel is described. However, as shown in FIG. 10, it may be configured to have a first output amplifier 260a and a second output amplifier 260b. In this case, in the vertically/horizontally-mixed-pixel-reading-out mode, scanning is performed by carrying out the separate and parallel output of the mixed pixel data D1 and D5 as shown in FIG. 4 from two channels simultaneously, then the separate and parallel output of the mixed pixel data D2 and D6 from two channels simultaneously, then the separate and parallel output of the mixed pixel data D3 and D7 from two channels simultaneously, then the separate and parallel output of the mixed pixel data D4 and D8 from two channels simultaneously. As for controlling the output, it is controlled in such a manner that the horizontal transfer switches h11, h21 are simultaneously closed, then the horizontal transfer switches h31, h41 are simultaneously closed, and then the horizontal transfer switches h51, h61 are simultaneously closed. Thereby, the mixed pixel data are outputted from the two channels of the output amplifiers 260a, 260b.

Furthermore, in the above description, the pixel data of nine pixels in every other line in both horizontal and vertical directions are mixed. However, in general, the present invention can be applied to the case of mixing the pixel data of $(2n+1)2$ pixels in every other line in both horizontal and vertical directions, with n being any natural number.

The solid state image pickup device of the present invention is effectively used as a digital camera and the like comprising both functions for picking up still pictures and recording moving pictures with high pixels.

While the invention has been described and illustrated in detail, it is to be clearly understood that this is intended be way of illustration and example only and is not to be taken by way of limitation, the spirit and scope of this invention being limited only be the terms of the following claims.

What is claimed is:

1. A solid state image pickup device, comprising a photoelectrical conversion element array and a control unit for controlling reading-out of pixel data from said photoelectrical conversion element array, wherein:

said photoelectrical conversion element array comprises a plurality of photoelectrical conversion elements (pixels) arranged in matrix and each of said pixels generates pixel data by performing photoelectrical conversion on incident light entering through an optical system; and said control unit, at the time of reading out said pixel data from said photoelectrical conversion element array, controls execution of:

a whole-pixel-reading-out mode for picking up still pictures, which outputs said read-out pixel data of the whole pixels in order by a data unit of a single pixel;

a vertically/horizontally-mixed-pixel-reading-out mode for recording moving pictures, which outputs said pixel data after mixing a plurality of pixels in the vertical and horizontal directions of said photo electrical conversion element array; and a one-directionally-mixed-pixel-reading-out mode for auto-focus, which, at the time of controlling said auto-focus, outputs pixel data mixed in only one direction by canceling mixing of pixel data for a plurality of pixels read out from said photoelectrical conversion element array in either the vertical direction or the horizontal direction of said photoelectrical conversion element array.

2. The solid state image pickup device according to claim 1, wherein said control unit, in said one-directionally-mixed-pixel-reading-out mode, controls to cancel mixing of pixels in the horizontal direction of photoelectrical conversion element array and to output vertically-mixed pixel data for auto-focus.

3. The solid state image pickup device according to claim 1, wherein said control unit, in said one-directionally-mixed-pixel-reading-out mode, controls to cancel mixing of pixels in the vertical direction of photoelectrical conversion element array and to output horizontally-mixed pixel data for auto-focus.

4. The solid state image pickup device according to claim 1, wherein said control unit is capable of controlling execution of:
 a first mixing cancel mode, which cancels mixing of pixels in the horizontal direction of said photoelectrical conversion element array and outputs vertically-mixed pixel data for auto-focus;
 a second mixing cancel mode, which cancels mixing of pixels in the vertical direction of said photoelectrical conversion element array and outputs horizontally-mixed pixel data for auto-focus; and
 switching said first and second mixing cancel mode.

5. The solid state image pickup device according to claim 1, wherein said control unit performs scanning with a group of pixels in six lines and six rows in said photoelectrical conversion element array being an output unit in said vertically/horizontally-mixed-pixel-reading-out mode, and operates with a mixed-nine-pixel unit in said vertically/horizontally-mixed-pixel-reading-out mode.

6. The solid state image pickup device according to claim 1, wherein said control unit comprises:
 a vertical transfer switch circuit for reading out pixel data from said photoelectrical conversion element array;
 signal voltage holding circuit for temporarily holding said read-out pixel data;
 a horizontal transfer switch circuit for outputting said pixel data or a mixed pixel data from said signal voltage holding circuit;
 a horizontal shift selection circuit for switching said whole-pixel-reading-out mode, said vertically/horizontally-mixed-pixel-reading-out mode, and said one-directionally-mixed-pixel-reading-out mode by controlling said horizontal transfer switch circuit; and
 an output amplifier for outputting pixel data or mixed pixel data from said horizontal switch circuit.

7. The solid state image pickup device according to claim 1, further comprising:
 an optical system to which an optical image of a subject makes incidence; and
 an auto-focus control unit for controlling a focal point of said optical system according to pixel data outputted for auto-focus from said control unit.

8. A solid state image pickup device, comprising a photoelectrical conversion element array and a control unit for controlling reading-out of pixel data from said photoelectrical conversion element array, wherein:
 said photoelectrical conversion element array comprises a plurality of photoelectrical conversion elements (pixels) arranged in matrix and each of said pixels comprises a photodiode formed of a MOS transistor, a cell amplifier formed of a MOS transistor, and a color filter; and
 said control unit, at the time of reading out said pixel data from said photoelectrical conversion element array, controls execution of:
 a whole-pixel-reading-out mode for picking up still pictures, which outputs said read-out pixel data of the whole pixels in order by a data unit of a single pixel;
 a vertically/horizontally-mixed-pixel-reading-out mode for recording moving pictures, which outputs said pixel data after mixing a plurality of pixels in the vertical and horizontal directions of said photo electrical conversion element array; and
 a one-directionally-mixed-pixel-reading-out mode for auto-focus, which, at the time of controlling said auto-focus, outputs pixel data mixed in only one direction by canceling mixing of pixel data for a plurality of pixels read out from said photoelectrical conversion element array in either the vertical direction or the horizontal direction of said photoelectrical conversion element array.

9. The solid state image pickup device according to claim 8, wherein said control unit, in said one-directionally-mixed-pixel-reading-out mode, controls to cancel mixing of pixels in the horizontal direction of photoelectrical conversion element array and to output vertically-mixed pixel data for auto-focus.

10. The solid state image pickup device according to claim 8, wherein said control unit, in said one-directionally-mixed-pixel-reading-out mode, controls to cancel mixing of pixels in the vertical direction of photoelectrical conversion element array and to output horizontally-mixed pixel data for auto-focus.

11. The solid state image pickup device according to claim 8, wherein said control unit is capable of controlling execution of:
 a first mixing cancel mode, which cancels mixing of pixels in the horizontal direction of said photoelectrical conversion element array and outputs vertically-mixed pixel data for auto-focus;
 a second mixing cancel mode, which cancels mixing of pixels in the vertical direction of said photoelectrical conversion element array and outputs horizontally-mixed pixel data for auto-focus; and
 switching said first and second mixing cancel mode.

12. The solid state image pickup device according to claim 8, wherein said control unit performs scanning with a group of pixels in six lines and six rows in said photoelectrical conversion element array being an output unit in said vertically/horizontally-mixed-pixel-reading-out mode, and operates with a mixed-nine-pixel unit in said vertically/horizontally-mixed-pixel-reading-out mode.

13. The solid state image pickup device according to claim 8, wherein said control unit comprises:
 a vertical transfer switch circuit for reading out pixel data from said photoelectrical conversion element array;
 signal voltage holding circuit for temporarily holding said read-out pixel data;
 a horizontal transfer switch circuit for outputting said pixel data or a mixed pixel data from said signal voltage holding circuit;
 a horizontal shift selection circuit for switching said whole-pixel-reading-out mode, said vertically/horizontally-mixed-pixel-reading-out mode, and said one-directionally-mixed-pixel-reading-out mode by controlling said horizontal transfer switch circuit; and
 an output amplifier for outputting pixel data or mixed pixel data from said horizontal switch circuit.

14. The solid state image pickup device according to claim 8, further comprising:

an optical system to which an optical image of a subject makes incidence; and an auto-focus control unit for controlling a focal point of said optical system according to pixel data outputted for auto-focus from said control unit.

15. A method of reading out pixel data from a photoelectrical conversion array comprising a plurality of photoelectrical conversion elements (pixels) arranged in a matrix, the method comprising:

a vertically/horizontally-mixed-pixel-reading-out step for recording moving pictures, which outputs said pixel data after mixing a plurality of pixels in the vertical and horizontal directions of said photoelectrical conversion element; and a one directionally-mixed-pixel-reading-out step for auto focus, which, at the time of controlling said auto-focus, outputs pixel data mixed in only one direction by canceling mixing of pixel data for a plurality of pixels read out from said photoelectrical conversion element array in either the vertical direction or the horizontal direction of said photo electrical conversion element array.

* * * * *